(12) United States Patent
Kurita et al.

(10) Patent No.: US 12,515,511 B2
(45) Date of Patent: Jan. 6, 2026

(54) VEHICLE MOUNTING STRUCTURE FOR ELECTRIC MOTOR UNIT

(71) Applicant: NISSAN MOTOR CO., LTD., Yokohama (JP)

(72) Inventors: Takashi Kurita, Kanagawa (JP); Kazuya Naoi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 308 days.

(21) Appl. No.: 18/281,736

(22) PCT Filed: Mar. 15, 2021

(86) PCT No.: PCT/JP2021/010442
§ 371 (c)(1),
(2) Date: Sep. 12, 2023

(87) PCT Pub. No.: WO2022/195686
PCT Pub. Date: Sep. 22, 2022

(65) Prior Publication Data
US 2025/0091426 A1    Mar. 20, 2025

(51) Int. Cl.
*B60K 6/40*    (2007.10)
(52) U.S. Cl.
CPC ..................... *B60K 6/40* (2013.01)
(58) Field of Classification Search
CPC ... B60K 6/40; B60K 6/20; B60K 6/22; B60K 6/24; B60K 6/26
See application file for complete search history.

(56) References Cited

U.S. PATENT DOCUMENTS

| 8,631,886 B2 * | 1/2014 | Kawamura | B60L 58/12 903/905 |
| 11,667,184 B2 * | 6/2023 | Miyakawa | B60K 6/46 180/65.22 |
| 2011/0180339 A1 | 7/2011 | Kawamura | |
| 2022/0227217 A1 | 7/2022 | Miyakawa et al. | |

FOREIGN PATENT DOCUMENTS

| JP | 2011-148445 A | 8/2011 |
| JP | 2013-126839 A | 6/2013 |
| WO | WO-2020/240736 A1 | 12/2020 |

* cited by examiner

*Primary Examiner* — John D Walters
(74) *Attorney, Agent, or Firm* — Foley & Lardner LLP

(57) ABSTRACT

A vehicle mounting structure for an electric motor unit includes: a drive unit with a drive motor; and a power generation unit with a power generation motor, wherein: the drive unit and the power generation unit are individually mounted on a vehicle body, the drive unit is fixed to a suspension member of the vehicle body, and the power generation unit is fixed to a side member of the vehicle body, the drive unit is provided behind the power generation unit, the drive unit and the power generation unit include an interference portion lower than a rotation shaft center of the drive motor and a rotation shaft center of the power generation motor, and a clearance between the drive unit and the power generation unit is narrower in the interference portion than in a portion other than the interference portion.

7 Claims, 7 Drawing Sheets

VEHICLE MOUNTING STRUCTURE FOR ELECTRIC MOTOR UNIT

TECHNICAL FIELD

The present invention relates to a vehicle mounting structure for an electric motor unit.

BACKGROUND ART

JP 2013-126839 A discloses a structure in which an inverter is mounted on a vehicle via a mounting bracket and an inverter tray. In this structure, when a collision load is applied to a front portion of the vehicle, the inverter is tilted together with the mounting bracket and the inverter tray, thereby reducing the collision load applied to the inverter. In addition, since a rear end of the inverter tray comes into contact with a power unit mount, interference of the inverter with the power unit mount, which is a high rigidity member, is prevented.

SUMMARY OF INVENTION

In a vehicle, an electric motor unit including a drive unit with a drive motor and a power generation unit with a power generation motor may be disposed in a motor room as follows. That is, the drive unit and the power generation unit may be individually mounted on a vehicle body, and the drive unit may be provided behind the power generation unit in a vehicle front-rear direction.

In such a vehicle, when the vehicle collides head-on, the power generation unit interferes with the drive unit and pushes the drive unit rearward. At this time, the drive motor is likely to rotate with respect to a rotation shaft of the drive motor due to its structure. Therefore, at this time, when the drive motor rotates in a direction in which an upper portion of the drive unit is directed rearward, the upper portion of the drive unit may locally interfere with another component disposed behind the drive unit.

In order to prevent the interference between the upper portion of the drive unit and the other component, for example, it is conceivable to attach another structure to the drive unit to provide cushioning at the time of a head-on collision. However, in this case, there is a risk of an increase in the number of components and an increase in a weight in addition to a complicated structure.

The present invention has been made in view of such a problem, and an object of the present invention is to prevent local interference of an upper portion of a drive unit by using a simple structure when a vehicle collides head-on.

A vehicle mounting structure for an electric motor unit according to one embodiment of the present invention comprises a drive unit with a drive motor; and a power generation unit with a power generation motor, wherein the drive unit and the power generation unit are individually mounted on a vehicle body. The drive unit is provided behind the power generation unit. The drive unit and the power generation unit include an interference portion lower than a rotation shaft center of the drive motor and a rotation shaft center of the power generation motor. A clearance between the drive unit and the power generation unit is narrower in the interference portion than in a portion other than the interference portion.

BRIEF DESCRIPTION OF DRAWINGS

FIG. 6 is a view illustrating a state in which a vehicle collides head-on.

DESCRIPTION OF EMBODIMENTS

Hereinafter, an embodiment of the present invention will be described with reference to the accompanying drawings.

Figure 1:
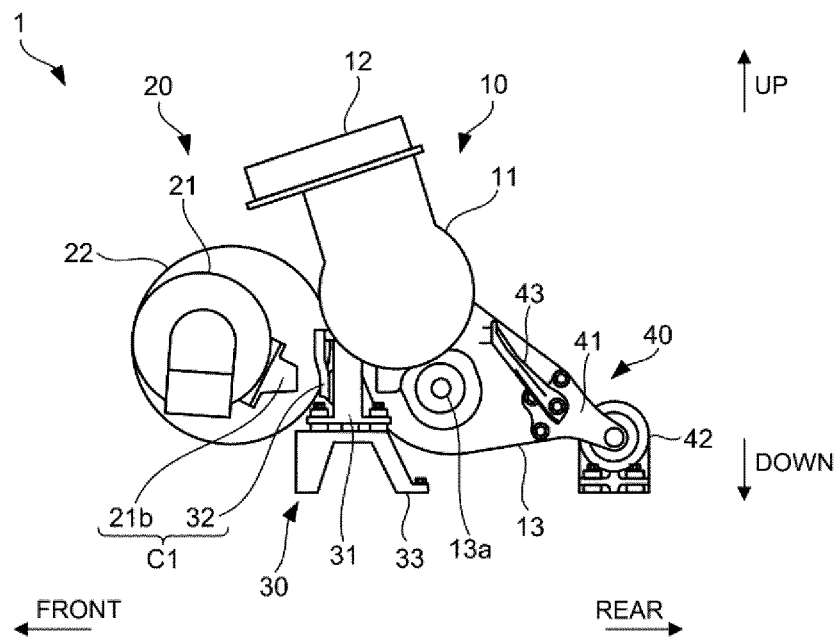
FIG. 1 is a view of an electric motor unit as viewed from a left side in a vehicle traveling direction.
Figure 2:
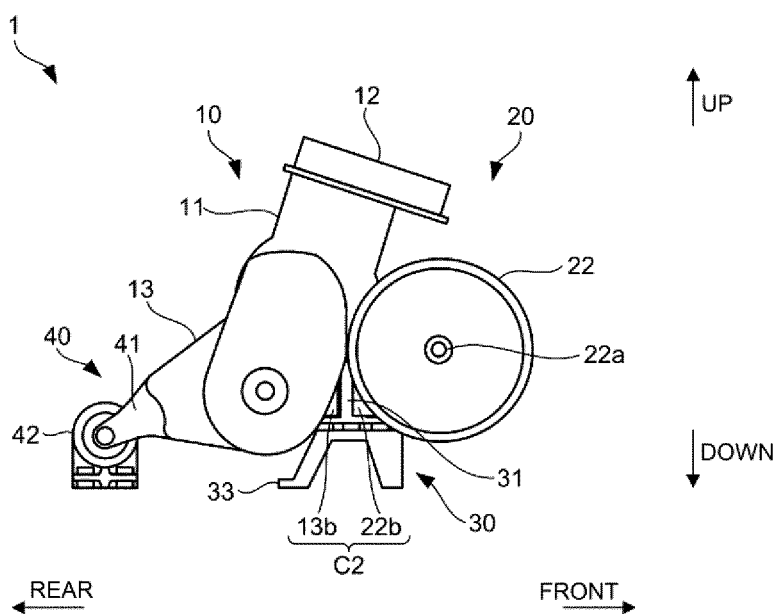
FIG. 2 is a view of the electric motor unit as viewed from a right side in the vehicle traveling direction.
Figure 3:
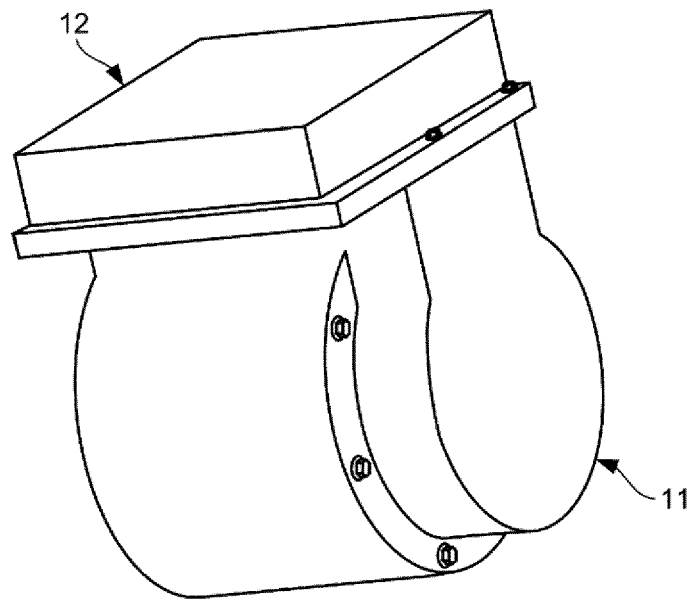
FIG. 3 is an external view of a drive motor.
Figure 4:
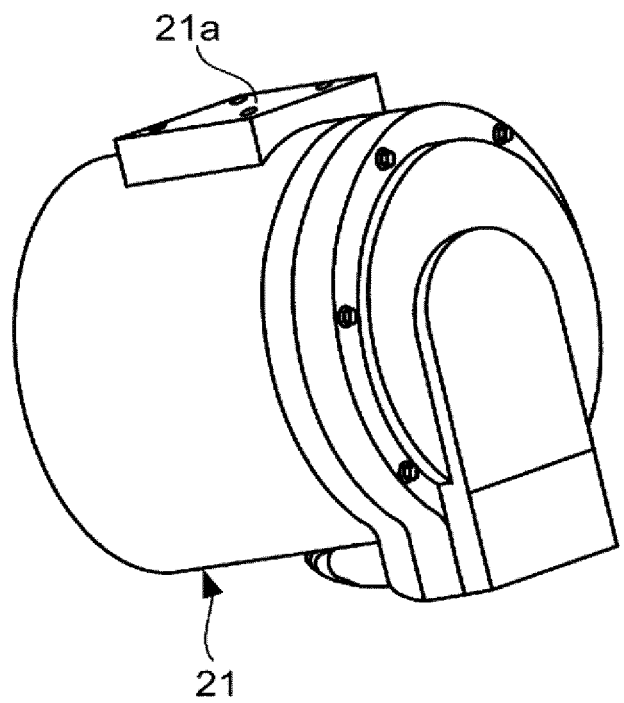
FIG. 4 is an external view of a power generation motor.
Figure 5:
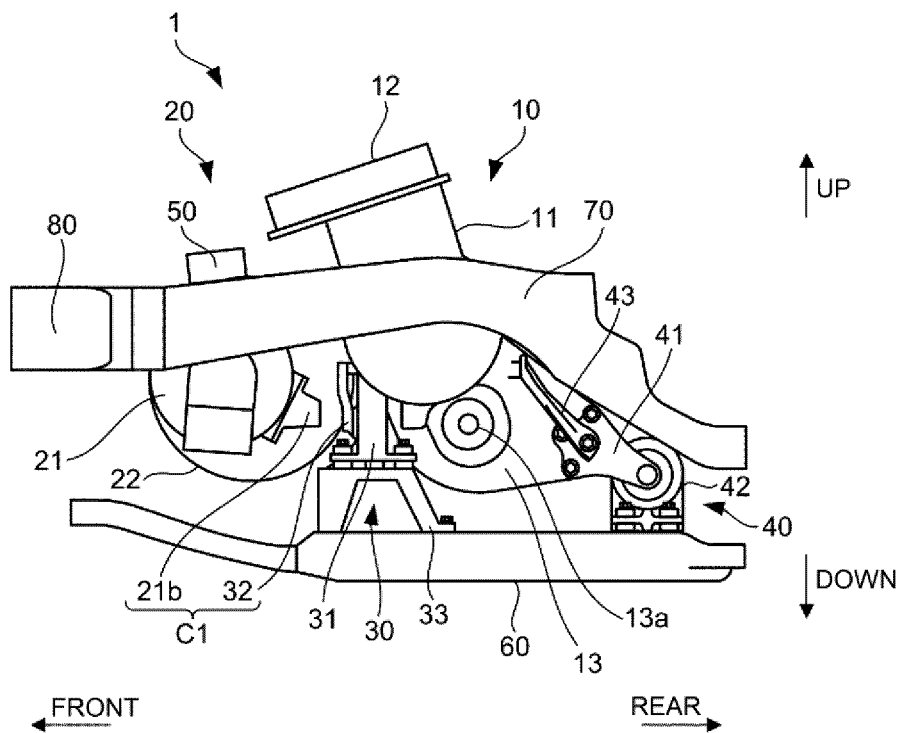
FIG. 5 is a view showing a state in which the electric motor unit is mounted on a vehicle body.

FIG. 1 is a view of an electric motor unit 1 as viewed from a left side with respect to a vehicle. FIG. 2 is a view of the electric motor unit 1 as viewed from a right side with respect to the vehicle. FIG. 3 is an external view of a drive motor 11. FIG. 4 is an external view of a power generation motor 21. FIG. 5 is a view showing a state in which the electric motor unit 1 is mounted on a vehicle body. FIG. 3 shows the drive motor 11 together with an inverter 12. In FIG. 1 and the like, front and rear indicate front and rear in a vehicle front-rear direction, and up and down indicate up and down in a vertical direction.

The electric motor unit 1 is mounted on the vehicle and includes a drive unit 10 and a power generation unit 20. The drive unit 10 includes the drive motor 11 shown in FIG. 3, and the power generation unit 20 includes the power generation motor 21 shown in FIG. 4. The drive motor 11 and the power generation motor 21 are both mounted on the vehicle. The vehicle is a series hybrid vehicle that travels by driving the drive motor 11 constituting a drive source of the vehicle using electric power generated by the power generation motor 21 using power of an internal combustion engine. The electric motor unit 1 is provided in a motor room located in a front portion of the vehicle.

The inverter 12 is disposed on an upper part of the drive motor 11. The drive motor 11 and the inverter 12 are integrally formed by bolt fastening, and a case of the inverter 12 is fixed to a case of the drive motor 11 by bolt fastening. The drive motor 11 and the power generation motor 21 are separate structures. Therefore, the drive unit 10 including the drive motor 11 and the power generation unit 20 including the power generation motor 21 are separate structures.

The drive unit 10 further includes a speed reducer 13. The speed reducer 13 is connected to the drive motor 11. The drive motor 11 and the speed reducer 13 are integrally formed by bolt fastening. The speed reducer 13 includes an output shaft 13a. The drive motor 11 transmits the power to the output shaft 13a via the speed reducer 13, and the power is transmitted to drive wheels of the vehicle via the output shaft 13a and a drive shaft of the vehicle connected to the output shaft 13a. The output shaft 13a is located lower than the drive motor 11.

The power generation unit 20 further includes a speed increaser 22. The speed increaser 22 is connected to the power generation motor 21. The power generation motor 21 and the speed increaser 22 are integrally formed by bolt fastening. The speed increaser 22 includes a rotation shaft 22a. The power is transmitted from the internal combustion engine to the rotation shaft 22a. Therefore, the power generation motor 21 generates the electric power using the power of the internal combustion engine.

The drive unit 10 further includes a first support portion 30 and a second support portion 40. The first support portion 30 is disposed under the drive motor 11 and supports the drive unit 10 from below. The first support portion 30 is connected to a suspension member 60 serving as the vehicle body shown in FIG. 5 from below and is connected to the drive unit 10 from above. The first support portion 30 is connected to the drive motor 11 and supports the drive unit 10 by supporting the drive motor 11.

The first support portion 30 includes a first bracket 31, a second bracket 32, and a third bracket 33. The first bracket 31 is disposed under the drive motor 11. The first bracket 31 extends upward and is connected to the drive motor 11.

The second bracket 32 is provided on a front portion of the first bracket 31. The second bracket 32 extends upward and is connected to the drive motor 11. The second bracket 32 is connected from the front to a boss provided on the case of the drive motor 11.

The third bracket 33 is disposed under the first bracket 31. The third bracket 33 is connected to the drive motor 11 from above and connected to the suspension member 60 from below.

The second support portion 40 is provided behind the first support portion 30. The second support portion 40 is provided at a rear lower portion of the drive unit 10 and supports the drive unit 10 from below. The second support portion 40 is connected to the suspension member 60 from below and is connected to the drive unit 10 from above. The second support portion 40 is connected to the speed reducer 13 and supports the drive unit 10 by supporting the speed reducer 13.

The second support portion 40 includes a bracket 41 and a mount member 42. The bracket 41 is connected to the speed reducer 13 from the front and above, and is connected to the mount member 42 from the rear and below. The bracket 41 is connected to the mount member 42 at a position lower than the output shaft 13a.

The mount member 42 is connected to the bracket 41 via a mount bush from above and is connected to the suspension member 60 from below. The second support portion 40 is further provided with a bracket 43. The bracket 43 connects the bracket 41 and the speed reducer 13. The bracket 43 is connected from behind to a boss provided on a case of the speed reducer 13.

The suspension member 60 is located below the electric motor unit 1, and the drive unit 10 is fixed to the suspension member 60 via the first support portion 30 and is fixed to the suspension member 60 via the second support portion 40, thereby a lower portion of the drive unit 10 is mounted on the vehicle body. The drive unit 10 is disposed in a forward tilting manner with respect to the vehicle.

The vehicle body includes a side member 70 and a bumper reinforcement 80 in addition to the suspension member 60. The side member 70 is disposed above the suspension member 60. The side member 70 is connected to the bumper reinforcement 80 on a vehicle front side, and extends from the bumper reinforcement 80 toward the rear of the vehicle. The output shaft 13a is located lower than the side member 70 and upper than the suspension member 60, and the inverter 12 is disposed above the side member 70.

The power generation unit 20 further includes a support portion 50. The power generation unit 20 is fixed to the side member 70 via the support portion 50. The power generation unit 20 is fixed in a state of being suspended from the side member 70 by the support portion 50. The support portion 50 is fixed to a fixing portion 21a of the power generation motor 21 shown in FIG. 4 by bolt fastening, and is fixed to the side member 70 by bolt fastening. The support portion 50 is fixed to an upper surface of the side member 70. Accordingly, an upper portion of the power generation unit 20 is mounted on the vehicle body.

The power generation motor 21 includes a convex portion 21b. The convex portion 21b is provided on a case of the power generation motor 21 and protrudes rearward. The convex portion 21b constitutes a first interference portion C1 together with the second bracket 32. An interference portion C including the first interference portion C1 which will be further described later.

Next, a vehicle mounting structure for the electric motor unit 1 including the drive unit 10 with the drive motor 11 and the power generation unit 20 with the power generation motor 21 will be described.

The drive unit 10 and the power generation unit 20 provided as described above are individually mounted on the vehicle body. The drive unit 10 is provided behind the power generation unit 20. In this case, when the vehicle collides head-on, interference occurs as described below.

Figure 6:
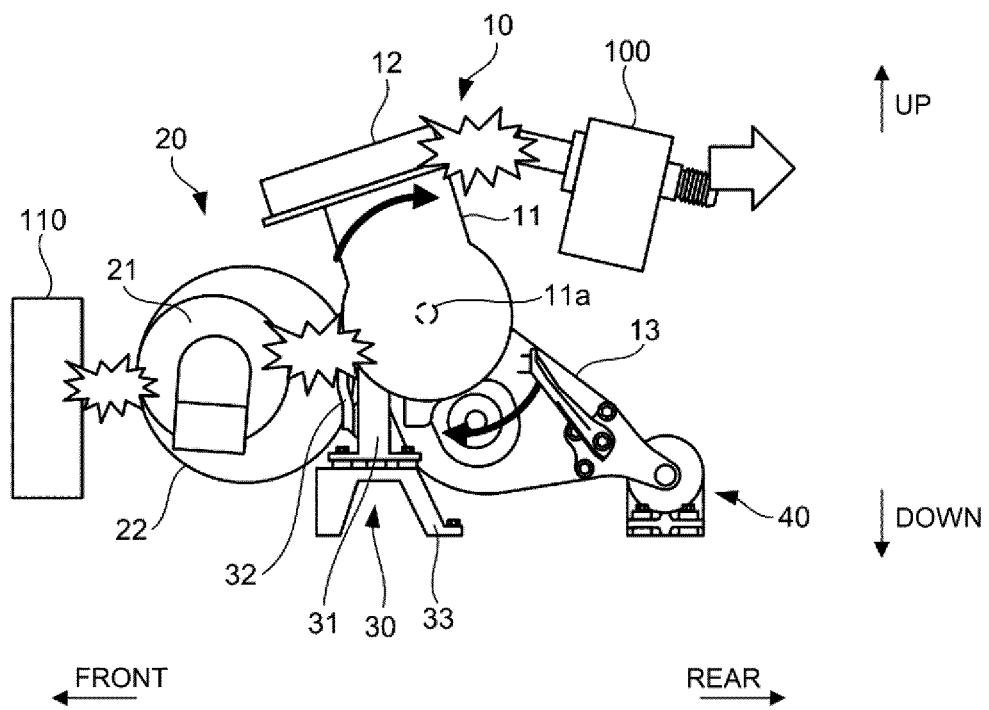

FIG. 6 is a view illustrating a state in which the vehicle collides head-on. FIG. 6 shows a case of a comparative example. The comparative example is configured in the same manner as the electric motor unit 1 except that the interference portion C is not provided. FIG. 6 shows a case where a brake booster 100 as another component is disposed behind the drive unit 10. The brake booster 100 is disposed behind an upper portion of the drive motor 11. Also In the present embodiment, the brake booster 100 is disposed behind the drive unit 10 in the same manner as shown in FIG. 6.

When the vehicle collides head-on, a barrier 110 provided in front of the power generation unit 20 interferes with the power generation unit 20 and pushes the power generation unit 20 rearward. The power generation unit 20 pushed rearward interferes with the drive unit 10 and pushes the drive unit 10 rearward. In this example, a clearance between the drive unit 10 and the power generation unit 20 is the narrowest between the drive motor 11 and the power generation motor 21. Therefore, in this example, the power generation motor 21 interferes with the drive motor 11.

When the power generation unit 20 interferes with the drive unit 10, the power generation unit 20 pushes the entire drive unit 10 rearward. On the other hand, the drive motor 11 includes a rotation shaft 11a indicated by a dashed line, and the drive motor 11 is likely to rotate with respect to the rotation shaft 11a due to its structure. Therefore, when the power generation unit 20 interferes with the drive unit 10, the drive motor 11 may rotate in a clockwise direction in the drawing, that is, a direction in which an upper portion of the drive unit 10 is directed rearward. As a result, there is a concern that the upper portion of the drive unit 10 may locally interfere with the other component disposed behind the drive unit 10.

In particular, in this example, since the upper portion of the drive unit 10 locally interferes with the brake booster 100, the brake booster 100 pushes a brake pedal in a vehicle compartment rearward. As a result, in this case, there is a concern that an impact may be transmitted to the brake pedal to be depressed by a driver.

In addition, in this example, when the power generation unit 20 pushes the entire drive unit 10, the drive unit 10 is to be pushed rearward with the second support portion 40 as a fulcrum. Therefore, in this example, combined with the above fact, the drive motor 11 is likely to rotate in the clockwise direction in the drawing.

In order to prevent the interference between the upper portion of the drive unit 10 and the other component, for example, it is conceivable to attach another structure to the drive unit 10 to provide cushioning at the time of the head-on collision. However, in this case, there is a concern about an increase in the number of components and an increase in a weight in addition to a complicated structure.

In view of such circumstances, in the present embodiment, the interference portion C is provided as follows.

Figure 7:
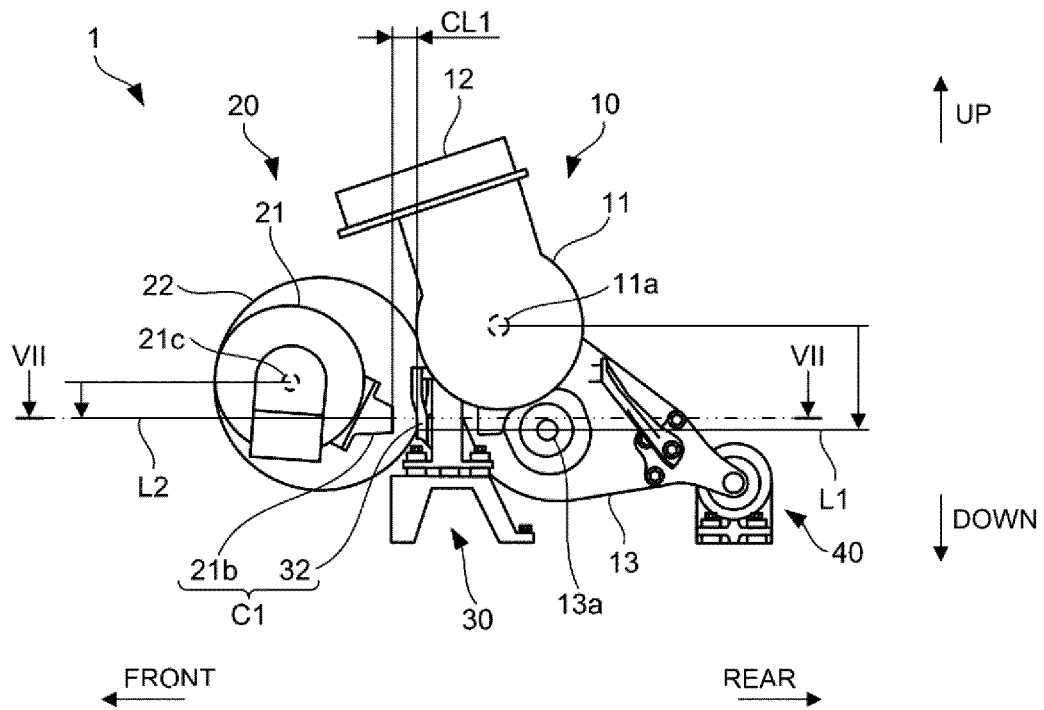
FIG. 7 is a first explanatory view of an interference portion.
Figure 8:
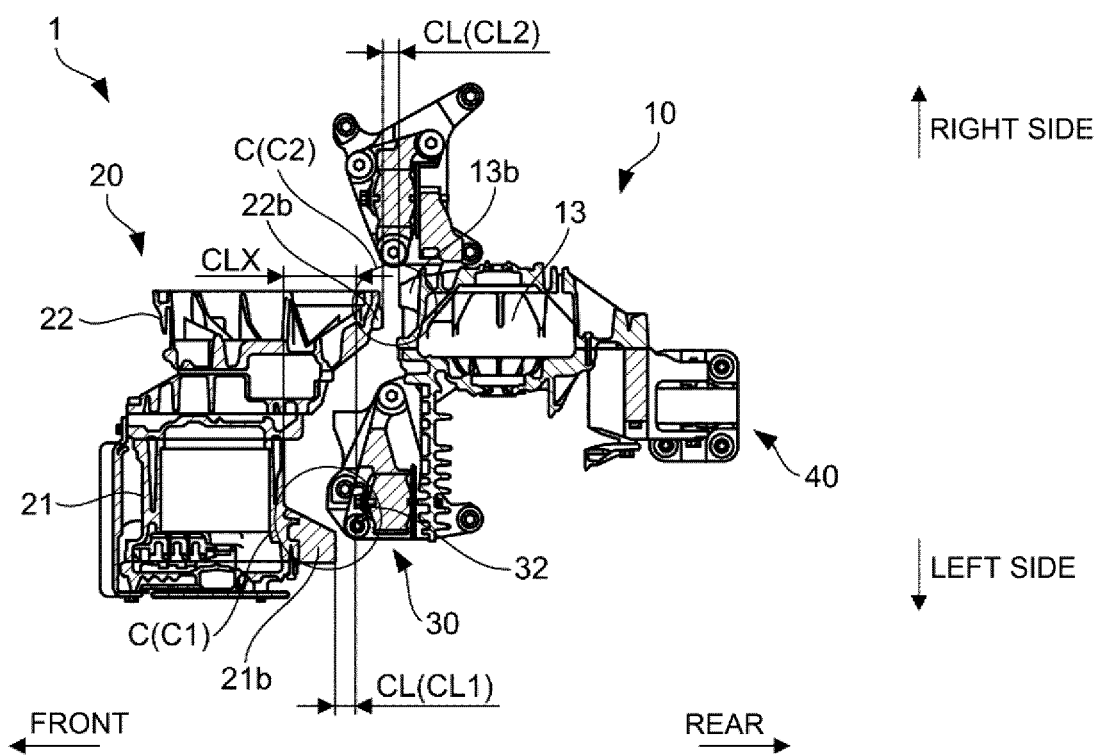
FIG. 8 is a view of the electric motor unit viewed from a VII-VII cross section.

FIG. 7 is a first explanatory view of the interference portion C. FIG. 8 is a view of the electric motor unit 1 viewed from a VII-VII cross section shown in FIG. 7. The VII-VII cross section is a cross section according to a horizontal plane including a vertical center position of the convex portion 21*b*. In FIG. 8, a right side and a left side indicate a right side and a left side with respect to a vehicle forward direction.

As shown in FIG. 7, the drive unit 10 and the power generation unit 20 include the first interference portion C1 lower than a center of the rotation shaft 11*a* of the drive motor 11 and a center of a rotation shaft 21*c* of the power generation motor 21, which are indicated by respective dashed lines. On a drive unit 10 side, the second bracket 32 constitutes the first interference portion C1, and on a power generation unit 20 side, the convex portion 21*b* constitutes the first interference portion C1. The rotation shaft 21*c* is located between the rotation shaft 11*a* and the output shaft 13*a* in the vertical direction.

In the first interference portion C1, the entire fixing portion of the second bracket 32 to the first bracket 31 on the drive unit 10 side is located lower than the center of the rotation shaft 11*a*. This is for the following reason. That is, when the convex portion 21*b* interferes with the second bracket 32 at the time of the head-on collision of the vehicle, a collision load is transmitted from the second br"cket'32 to the first bracket 31 via the fixing portion to the first bracket 31. Therefore, specifically, the first interference portion C1 on the drive unit 10 side is the fixing portion of the second bracket 32 to the first bracket 31 from a viewpoint of transmitting the collision load. A line L1 indicates a vertical center position of the fixing portion of the second bracket 32, which represents a vertical position of the fixing portion of the second bracket 32.

Since the entire fixing portion of the second bracket 32 is located lower than the center of the rotation shaft 11*a*, the collision load is input from the power generation unit 20 at a position lower than the center of the rotation shaft 11*a*. The entire fixing portion of the second bracket 32 is located further lower than the center of the rotation shaft 21*c*. Accordingly, the collision load is further input from the power generation unit 20 at a position lower than the center of the rotation shaft 21*c*. The same applies to a case where the vertical center position of the fixing portion of the second bracket 32, rather than the entire fixing portion, is lower than the center of the rotation shaft 11*a*, and a case where the vertical center position is further lower than the center of the rotation shaft 21*c*.

In the first interference portion C1, the entire tip end surface of the convex portion 21*b* on the power generation unit 20 side is located lower than the center of the rotation shaft 21*c*. Specifically, the first interference portion C1 on the power generation unit 20 side is the tip end surface of the convex portion 21*b* from a viewpoint of the interference with the second bracket 32. The tip end surface of the convex portion 21*b* is an interference portion with the second bracket 32, and a line L2 indicates a vertical center position of the tip end surface, which represents a vertical position of the tip end surface of the convex portion 21*b*. The tip end surface of the convex portion 21*b* interferes with the fixing portion of the second bracket 32. The fixing portion of the second bracket constitutes an opposing portion to the first interference portion C1 on the power generation unit 20 side, and the tip end surface of the convex portion 21*b* constitutes an opposing portion to the first interference portion C1 on the power generation unit 20 side.

Since the entire tip end surface of the convex portion 21*b* is located lower than the center of the rotation shaft 21*c*, the collision load is transmitted from the power generation unit 20 to the drive unit 10 at a position lower than the center of the rotation shaft 21*c*. The entire tip end surface of the convex portion 21*b* is further located lower than the center of the rotation shaft 11*a*. Accordingly, the collision load is further transmitted from the power generation unit 20 to the drive unit 10 at a position lower than the center of the rotation shaft 11*a*. The same applies to a case where the vertical center position of the tip end surface of the convex portion 21*b*, rather than the entire tip end surface, is lower than the center of the rotation shaft 21*c*, and a case where the vertical center position is lower than the center of the rotation shaft 11*a*.

The drive unit 10 and the power generation unit 20 include the first interference portion C1 lower than the center of the rotation shaft 11*a* and the center of the rotation shaft 21*c* because the fixing portion of the second bracket 32 is lower than the center of the rotation shaft 11*a* and the tip end surface of the convex portion 21*b* is lower than the center of the rotation shaft 21*c*. The drive unit 10 and the power generation unit 20 include the first interference portion C1 lower than the center of the rotation shaft 11*a* and the center of the rotation shaft 21*c* because both the fixing portion of the second bracket 32 and the tip end surface of the convex portion 21*b* are lower than both the center of the rotation shaft 11*a* and the center of the rotation shaft 21*c*.

According to the first interference portion C1, after the head-on collision of the vehicle, the power generation motor 21 interferes with the lower portion of the drive unit 10. Accordingly, compared to a case of the comparative example described above with reference to FIG. 6, the drive motor 11 is likely to rotate in a counterclockwise direction in the drawing, and thus the drive motor 11 is prevented from rotating in the clockwise direction in the drawing. Therefore, the upper portion of the drive unit 10 is prevented from locally interfering with the other component. In addition, at this time, the power generation motor 21 is also prevented from pushing the entire drive unit 10 rearward with the second support portion 40 as the fulcrum. As a result, the upper portion of the drive unit 10 is further prevented from locally interfering with the other component.

As shown in FIG. 8, the drive unit 10 and the power generation unit 20 further include a second interference portion C2 as the interference portion C. The second interference portion C2 includes a convex portion 13b and a convex portion 22b. The convex portion 13b is provided on the speed reducer 13, and the convex portion 22b is provided on the speed increaser 22. The convex portion 13b is implemented by a part of the case of the speed reducer 13, and is disposed on a front portion of the case. The convex portion 22b is implemented by a part of a case of the speed increaser 22, and is disposed on a rear portion of the case. As s"own 'n FIG. 11 to be described later, the drive unit 10 and the power generation unit 20 include the second interference portion C2 lower than the center of the rotation shaft 11a of the drive motor 11 and the center of the rotation shaft 21c of the power generation motor 21, similarly to the first interference portion C1.

The interference portion C has a clearance CL. A first clearance CL1 indicates the clearance CL of the first interference portion C1, and a second clearance CL2 indicates the clearance CL of the second interference portion C2. The clearance CL is a clearance in the vehicle front-rear direction. The clearance CL is used as a clearance indexing a clearance in a direction in which the power generation unit 20 is actually pushed and interferes with the drive unit 10 at the time of the head-on collision of the vehicle (hereinafter, referred to as an interference direction of the power generation unit 20), instead of the clearance. In other words, the clearance CL is substituted for the clearance of the power generation unit 20 in the interference direction.

In relation to the above, in each of the first interference portion C1 and the second interference portion C2, the opposing portions of the interference portion C on the drive unit 10 side and the interference portion C on the power generation unit 20 side are close to each other in a vehicle left-right direction, but do not overlap each other. This is because, in the present embodiment, the power generation unit 20 tends to be pushed to the right rear and interfere with the drive unit 10 at the time of the actual head-on collision of the vehicle.

Therefore, in the present embodiment, in each of the first interference portion C1 and the second interference portion C2, the interference portion C on the drive unit 10 side is disposed on a right rear side with respect to the interference portion C on the power generation unit 20 side. That is, the interference portion C may be a portion where the interference occurs at the time of the actual head-on collision of the vehicle, and it is not necessary that the opposing portions of the interference portion C on the drive unit 10 side and the interference portion C on the power generation unit 20 side overlap each other in a vehicle left-right direction position or a vertical position.

The clearance between the drive unit 10 and the power generation unit 20 is set to be narrower in the interference portion C than in portions other than the interference portion C. The other portions include a housing of the electric motor unit 1 and a support portion of the electric motor unit 1 other than the interference portion C. The housing of the electric motor unit 1 includes the cases of the drive motor 11, the power generation motor 21, the speed reducer 13, and the speed increaser 22, and the support portion of the electric motor unit 1 includes the first support portion 30 and the second support portion 40.

A clearance CLX is an example of a clearance of the portions other than the interference portion C. The clearance CLX indicates a clearance that is relatively close in size to a clearance of an interference portion in the case of the comparative example described above with reference to FIG. 6 although a vertical position is different from that of the interference portion. Referring also to FIG. 6, the clearance CL is sufficiently narrower than the clearance in the case of the comparative example.

The clearance CL is set to substantially the same size in the first clearance CL1 and the second clearance CL2. Accordingly, occurrence of local interference in either the first interference portion C1 or the second interference portion C2 is prevented. As a result, since the collision load is dispersed by the first interference portion C1 and the second interference portion C2, a large load is prevented from being applied to a part of the cases provided on the drive unit 10 and the power generation unit 20.

Figure 9:
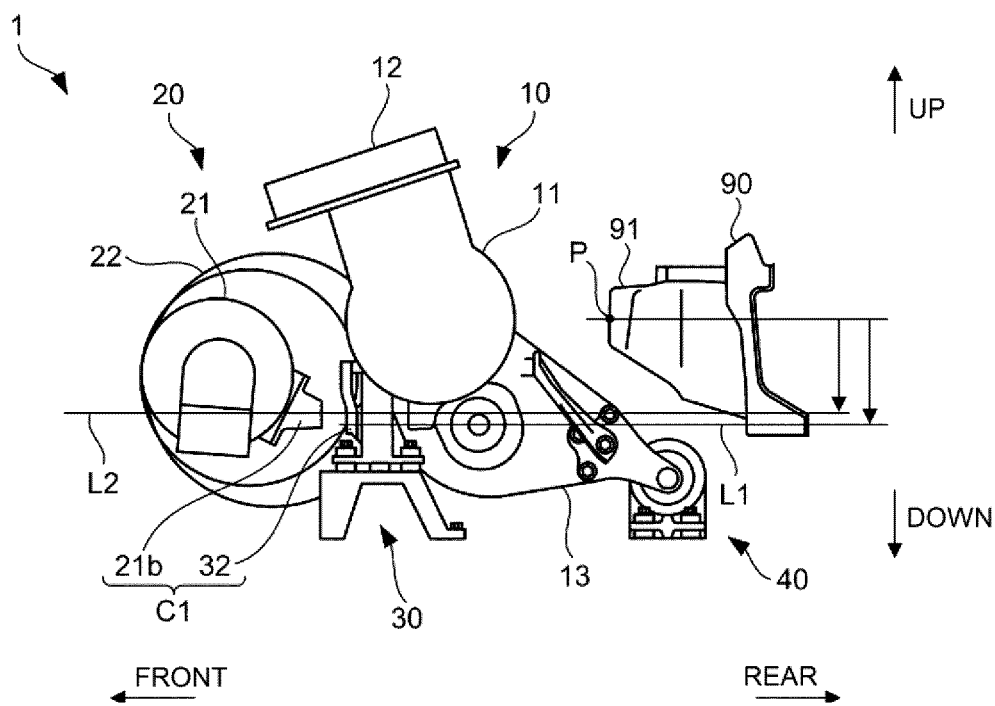
FIG. 9 is a second explanatory view of the interference portion.
Figure 10:
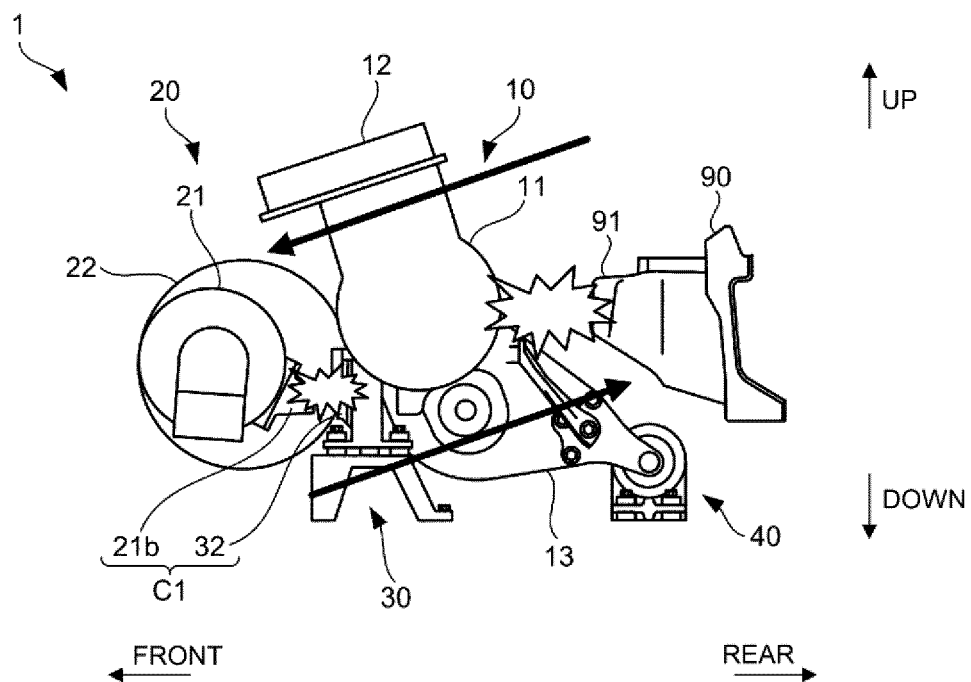
FIG. 10 is a view illustrating a state of interference with a dash panel.

FIG. 9 is a second explanatory view of the interference portion C. FIG. 10 is a view illustrating a state of interference with a dash panel 90. The vehicle body further includes the dash panel 90. The dash panel 90 is located behind the drive unit 10 and separates the motor room and the vehicle compartment. The dash panel 90 includes a forward projecting portion 91. The forward projecting portion 91 is located behind a lower portion of the drive motor 11, and the drive unit 10 interferes with the forward projecting portion 91 at the time of the head-on collision of the vehicle. The drive motor 11 interferes with the forward projecting portion 91.

The first interference portion C1 is provided lower than an interference position P of the dash panel 90 with the drive unit 10. The interference position P is included in the forward projecting portion 91. The first interference portion C1 is provided lower than the interference position P because both a vertical position of the second bracket 32 and a vertical position of the convex portion 21b are lower than the interference position P. Similarly to the first interference portion C1, the second interference portion C2 is also provided lower than the interference position P.

As shown in FIG. 10, when the vehicle collides head-on, the power generation motor 21 interferes with the drive unit 10 at the first interference portion C1. Accordingly, when the drive unit 10 is pushed rearward and interferes with the dash panel 90 at the interference position P, the collision load is transmitted at a position lower than the interference position P from the power generation motor 21 to the drive unit 10. Therefore, the drive unit 10 is pushed rearward at a position lower than the interference position P.

As a result, above the interference position P, the drive unit 10 is pushed forward with the interference position P as a fulcrum. That is, the entire drive unit 10 is to be rotated counterclockwise in the drawing with the interference position P as the fulcrum. Therefore, the upper portion of the drive unit 10 is prevented from locally interfering with the brake booster 100 with the brake booster 100 as a first interference point.

Figure 11:
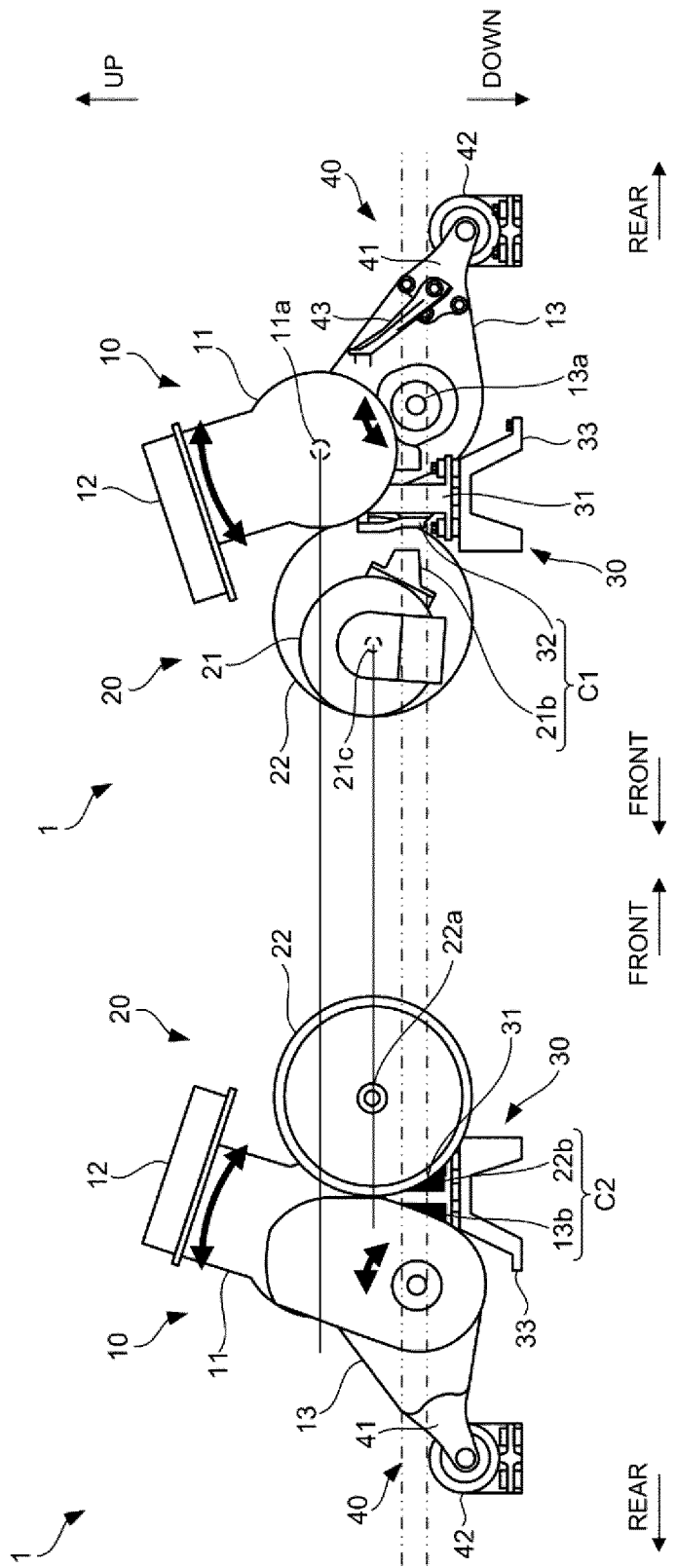
FIG. 11 is a third explanatory view of the interference portion.

FIG. 11 is a third explanatory view of the interference portion C. In FIG. 11, the convex portion 13b and the convex portion 22b are painted black in consideration of visibility. As shown in FIG. 11, in the electric motor unit 1, since the drive unit 10 and the power generation unit 20 are separate bodies, the clearance between the drive unit 10 and the power generation unit 20 may be reduced as a result of swinging of the units. At this time, since the drive unit 10 is supported from below, the upper portion of the drive unit 10 swings more.

Therefore, in the electric motor unit 1, the first interference portion C1 on a power generation motor 21 side, that is, the convex portion 21b, and the second interference portion C2 on a speed increaser 22 side, that is, the convex portion 22b, are provided at positions overlapping the first support portion 30 in the vertical direction. The convex portion 21b and the convex portion 22b are provided at positions overlapping the fixing portion of the second bracket 32. A two-dot dashed line indicates a range of the vertical position of the entire fixing portion of the second bracket 32.

Accordingly, the convex portion 21*b* and the convex portion 22*b* on the power generation unit 20 side are arranged with respect to a portion where the swing of the drive unit 10 is small. As a result, the first clearance CL1 and the second clearance CL2 are secured to be sufficiently large even in a situation where the swinging is large.

Figure 12:
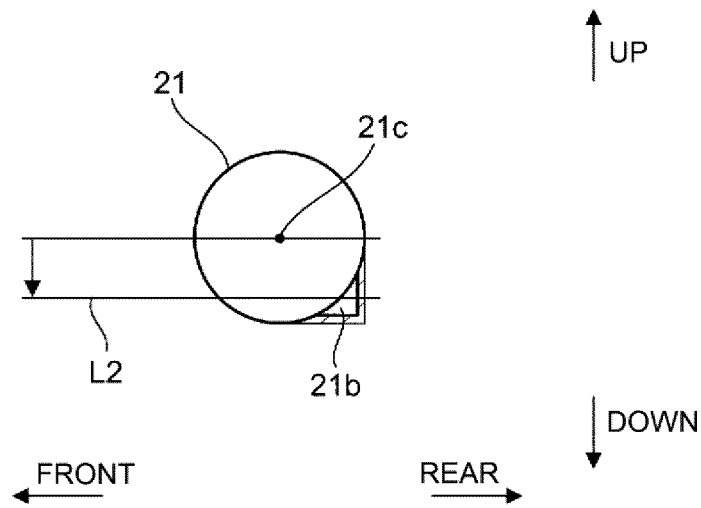
FIG. 12 is a first view of a fourth explanatory view of the interference portion.
Figure 13:
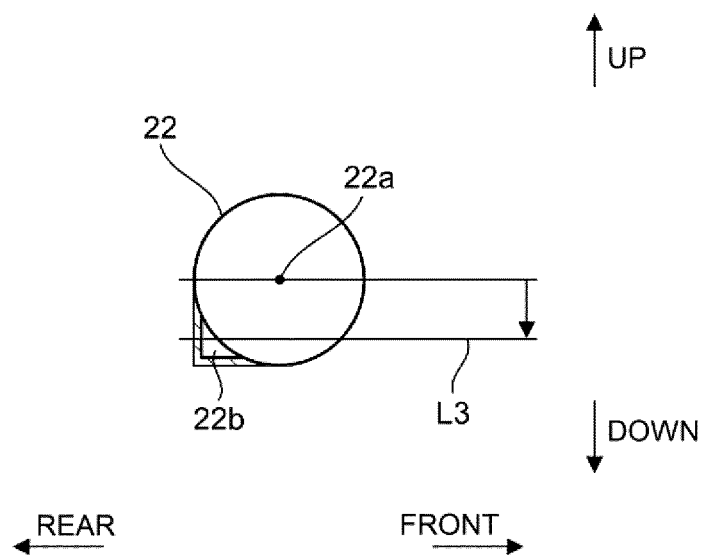
FIG. 13 is a second view of the fourth explanatory view of the interference portion.

FIG. 12 is a first view of a fourth explanatory view of the interference portion C. FIG. 13 is a second view of the fourth explanatory view of the interference portion C. Hatching indicates a space formed below each of substantially cylindrical side wall portions of the cases of the power generation motor 21 and the speed increaser 22. In FIG. 13, a line L3 indicates a vertical center position of the tip end surface, which represents a vertical position of a tip end surface of the convex portion 22*b*, which is an interference portion with the convex portion 13*b*.

As shown in FIGS. 12 and 13, in the electric motor unit 1, the first interference portion C1 on the power generation motor 21 side, that is, the convex portion 21*b* is disposed vertically lower than the center of the rotation shaft 21*c* of the power generation motor 21, and the second interference portion C2 on the speed increaser 22 side, that is, the convex portion 22*b* is disposed vertically lower than the center of the rotation shaft 22*a* of the speed increaser 22. In the convex portion 21*b*, the entire convex portion 21*b* is disposed vertically lower than the center of the rotation shaft 21*c*, and in the convex portion 22*b*, the entire convex portion 22*b* is disposed vertically lower than the center of the rotation shaft 22*a*.

By arranging the convex portion 21*b* and the convex portion 22*b* on the power generation unit 20 side in this way, the space indicated by the hatching can be effectively used. As a result, expansion of the electric motor unit 1 in the vehicle front-rear direction for arranging the convex portion 21*b* and the convex portion 22*b* is prevented, which contributes to miniaturization of the electric motor unit 1. The same applies to a case where the vertical position of the tip end surface of the convex portion 21*b*, rather than the entire tip end surface, is lower than the center of the rotation shaft 21*c*, and a case where the vertical position of the tip end surface of the convex portion 22*b*, rather than the entire tip end surface, is lower than the center of the rotation shaft 22*a*.

Next, a main function and effect of the present embodiment will be described.

A vehicle mounting structure for the electric motor unit 1 is the vehicle mounting structure for the electric motor unit 1 including the drive unit 10 with the drive motor 11 and the power generation unit 20 with the power generation motor 21, and the drive unit 10 and the power generation unit 20 are individually mounted on the vehicle body. The drive unit 10 is provided behind the power generation unit 20. The drive unit 10 and the power generation unit 20 include the interference portion C lower than the center of the rotation shaft 11*a* of the drive motor 11 and the center of the rotation shaft 21*c* of the power generation motor 21. As can be seen from the clearance CL, the clearance between the drive unit 10 and the power generation unit 20 is narrower in the interference portion C than in the portions other than the interference portion C.

According to such a configuration, after the head-on collision of the vehicle, the power generation motor 21 interferes with the lower portion of the drive unit 10. Accordingly, compared to the case of the comparative example described above with reference to FIG. 6, the drive motor 11 is likely to rotate in the counterclockwise direction in the drawing, for example, in FIG. 6, and thus the drive motor 11 is prevented from rotating in the clockwise direction in the drawing. Therefore, the local interference of the upper portion of the drive unit 10 with a component other than the electric motor unit 1 can be prevented, the component being disposed behind the drive unit 10.

In particular, in the present embodiment, the brake booster 100 as another component is disposed behind the drive motor 11. Therefore, it is possible to prevent the transmission of the impact to the brake pedal depressed by the driver as a result of the local interference of the upper portion of the drive unit 10 with the brake booster 100.

In addition, at this time, the power generation motor 21 is also prevented from pushing the entire drive unit 10 rearward with the second support portion 40 as the fulcrum. As a result, the upper portion of the drive unit 10 can be further prevented from locally interfering with the other component.

Further, according to such a configuration, compared to a case where another structure is attached to the drive unit 10 to provide cushioning at the time of the head-on collision, problems of the increase in the number of components and the increase in the weight in addition to the complicated structure can also be prevented. Therefore, the local interference of the upper portion of the drive unit 10 can be prevented by using a simple structure when the vehicle collides head-on.

In the present embodiment, the vehicle body includes the dash panel 90 behind the drive unit 10, and the interference portion C is provided lower than the interference position P of the dash panel 90 with the drive unit 10.

According to such a configuration, after the head-on collision of the vehicle, after the drive unit 10 interferes with the dash panel 90 at the interference position P, the drive unit 10 can be pushed rearward at a position lower than the interference position P due to the collision load. As a result, the entire drive unit 10 is likely to rotate in a direction in which the upper portion of the drive unit 10 is pushed forward with the interference position P as the fulcrum. Therefore, the upper portion of the drive unit 10 can be prevented from interfering with the component other than the electric motor unit 1 with the component as the first interference point, thereby further preventing the local interference with the other component.

In the present embodiment, the drive unit 10 includes the speed reducer 13 connected to the drive motor 11, and the power generation unit 20 includes the speed increaser 22 connected to the power generation motor 21. The interference portion C includes the first interference portion C1 provided on the drive motor 11 and the power generation motor 21, and the second interference portion C2 provided on the speed reducer 13 and the speed increaser 22.

According to such a configuration, since the collision load is dispersed by the first interference portion C1 and the second interference portion C2, the large load can be prevented from being applied to a part of the cases of the drive unit 10 and the power generation unit 20.

In the present embodiment, the drive unit 10 further includes the first support portion 30 that is fixed to the vehicle body and supports the drive motor 11 from below. The first interference portion C1 on the power generation motor 21 side, that is, the convex portion 21*b*, and the second interference portion C2 on the speed increaser 22 side, that is, the convex portion 22*b*, are provided at the positions overlapping the first support portion 30 in the vertical direction.

According to such a configuration, the convex portion 21b and the convex portion 22b on the power generation unit 20 side are arranged with respect to the portion where the swing of the drive unit 10 is small. Therefore, the first clearance CL1 and the second clearance CL2 can be secured to be sufficiently large even in the situation where the swinging is large.

In the present embodiment, the first interference portion C1 on the power generation unit 20 side, that is, the convex portion 21b is disposed vertically lower than the center of the rotation shaft 21c of the power generation motor 21, and the second interference portion C2 on the speed increaser 22 side, that is, the convex portion 22b is disposed vertically lower than the center of the rotation shaft 22a of the speed increaser 22.

According to such a configuration, the space formed below each of the substantially cylindrical side wall portions of the cases of the power generation motor 21 and the speed increaser 22 can be effectively used for arranging the convex portion 21b and the convex portion 22b. Therefore, the expansion of the electric motor unit 1 in the vehicle front-rear direction for arranging the convex portion 21b and the convex portion 22b can be prevented, and it is possible to contribute to the miniaturization of the electric motor unit 1.

In the present embodiment, the power generation unit 20 is mounted on the vehicle body at the upper portion of the power generation unit 20, and the drive unit 10 is mounted on the vehicle body at the lower portion of the drive unit 10. According to such a configuration, since the power generation unit 20 mounted on the vehicle body at the upper portion is easily pushed rearward at the lower portion at the time of the head-on collision of the vehicle, the drive unit 10 an" the'power generation unit 20 can be made to interfere with each other more reliably at the interference portion C.

In the present embodiment, the drive unit 10 further includes the inverter 12. The inverter 12 is disposed on an upper part of the drive unit 10. That is, in the present embodiment, the local interference of the upper portion of the drive unit 10 with the other component can be prevented, and thus according to such a configuration, it is possible to integrate the drive motor 11 and the inverter 12 while preventing damage to the inverter 12 at the time of the head-on collision of the vehicle.

Although the embodiment of the present invention has been described above, the above embodiment merely exemplifies some of application examples of the present invention and does not intend to limit the technical scope of the present invention to the specific configurations of the above embodiment.

In the above embodiment, a case where the first interference portion C1 on the drive unit 10 side is configured by the second bracket 32 has been described. However, the first interference portion C1 on the drive unit 10 side may be configured by, for example, the case of the drive motor 11 or a convex portion provided on the first support portion 30.

The invention claimed is:

1. A vehicle mounting structure for an electric motor unit comprising:
   a drive unit with a drive motor; and
   a power generation unit with a power generation motor, wherein:
   the drive unit and the power generation unit are individually mounted on a vehicle body,
   the drive unit is fixed to a suspension member of the vehicle body, and the power generation unit is fixed to a side member of the vehicle body,
   the drive unit is provided behind the power generation unit,
   the drive unit and the power generation unit include an interference portion lower than a rotation shaft center of the drive motor and a rotation shaft center of the power generation motor, and
   a clearance between the drive unit and the power generation unit is narrower in the interference portion than in a portion other than the interference portion.

2. The vehicle mounting structure for an electric motor unit according to claim 1, wherein
   the vehicle body includes a dash panel behind the drive unit, and
   the interference portion is provided lower than an interference position of the dash panel with the drive unit.

3. The vehicle mounting structure for an electric motor unit according to claim 1, wherein
   the drive unit includes a speed reducer connected to the drive motor,
   the power generation unit includes a speed increaser connected to the power generation motor, and
   the interference portion includes a first interference portion provided on the drive motor and the power generation motor, and a second interference portion provided on the speed reducer and the speed increaser.

4. The vehicle mounting structure for an electric motor unit according to claim 3, wherein
   the drive unit further includes a support portion that is fixed to the vehicle body and supports the drive motor from below, and
   the first interference portion on a power generation motor side and the second interference portion on a speed increaser side are provided at positions overlapping the support portion in a vertical direction.

5. The vehicle mounting structure for an electric motor unit according to claim 4, wherein
   the first interference portion on the power generation motor side is disposed vertically lower than the rotation shaft center of the power generation motor, and the second interference portion on the speed increaser side is disposed vertically lower than a rotation shaft center of the speed increaser.

6. The vehicle mounting structure for an electric motor unit according to claim 3, wherein
   the power generation unit is mounted on the vehicle body at an upper portion of the power generation unit, and
   the drive unit is mounted on the vehicle body at a lower portion of the drive unit.

7. The vehicle mounting structure for an electric motor unit according to claim 6, wherein
   the drive unit further includes an inverter, and
   the inverter is disposed on an upper part of the drive unit.

* * * * *